United States Patent
Campbell et al.

(10) Patent No.: US 9,981,704 B2
(45) Date of Patent: May 29, 2018

(54) TRACK CHANGING APPARATUS AND METHODS ASSOCIATED THEREWITH

(71) Applicant: DEW Engineering and Development ULC, Ottawa (CA)

(72) Inventors: Colin Campbell, Ottawa (CA); Guy Carrier, Ottawa (CA); Camil Giguere, Ottawa (CA); Michael Harris, Ottawa (CA); Neil Hutton, Ottawa (CA); John Beattie, Ottawa (CA); Ian Marsh, Ottawa (CA)

(73) Assignee: DEW ENGINEERING AND DEVELOPMENT ULC, Ottawa, Ontario (CA)

( * ) Notice: Subject to any disclaimer, the term of this patent is extended or adjusted under 35 U.S.C. 154(b) by 258 days.

(21) Appl. No.: 15/004,542

(22) Filed: Jan. 22, 2016

(65) Prior Publication Data
US 2016/0214665 A1    Jul. 28, 2016

Related U.S. Application Data

(60) Provisional application No. 62/107,201, filed on Jan. 23, 2015.

(51) Int. Cl.
*B62D 55/32* (2006.01)
*B23P 19/04* (2006.01)

(52) U.S. Cl.
CPC .............. *B62D 55/32* (2013.01); *B23P 19/04* (2013.01)

(58) Field of Classification Search
CPC ................................ B23P 19/04; B62D 55/32
USPC .......................................................... 29/450
See application file for complete search history.

(56) References Cited

U.S. PATENT DOCUMENTS

| | | | | |
|---|---|---|---|---|
| 2,392,251 | A * | 1/1946 | Matthews | B29B 17/02 29/252 |
| 5,870,812 | A * | 2/1999 | Abdel-Azeem | B62D 55/32 248/351 |
| 6,654,994 | B2 * | 12/2003 | LaFevers | B62D 55/04 29/252 |
| 6,662,421 | B1 * | 12/2003 | Krippelz, Sr. | B25B 27/0035 248/229.12 |
| 9,260,146 | B2 * | 2/2016 | Bair | B62D 55/32 |
| 2013/0239405 | A1 * | 9/2013 | Griffith | B23P 6/00 29/700 |

(Continued)

FOREIGN PATENT DOCUMENTS

JP     2002337769 A     11/2002

OTHER PUBLICATIONS

International Search Report and Written Opinion issued in PCT/IB2016/000284, dated Jun. 21, 2016, 8 pages.

*Primary Examiner* — Christopher M Koehler
(74) *Attorney, Agent, or Firm* — Faegre Baker Daniels LLP

(57) ABSTRACT

A track changing apparatus for changing a track on an armored vehicle includes a plurality of moveable elements. The plurality of moveable elements of the track changing apparatus allows a track to be manipulated from loose or unmounted state, to a tensioned state wherein the track is located on the track changing apparatus, and finally, to a fully mounted state wherein the track has been transferred onto the armored vehicle. In at least one embodiment, the track changing apparatus may be used to remove a track from an armored vehicle. Methods of using a track changing apparatus are also described, including a method of mounting a track onto an armored vehicle.

5 Claims, 20 Drawing Sheets

(56) References Cited

U.S. PATENT DOCUMENTS

2016/0159419 A1* 6/2016 Jeevanantham .......... B60T 3/00
29/559

* cited by examiner

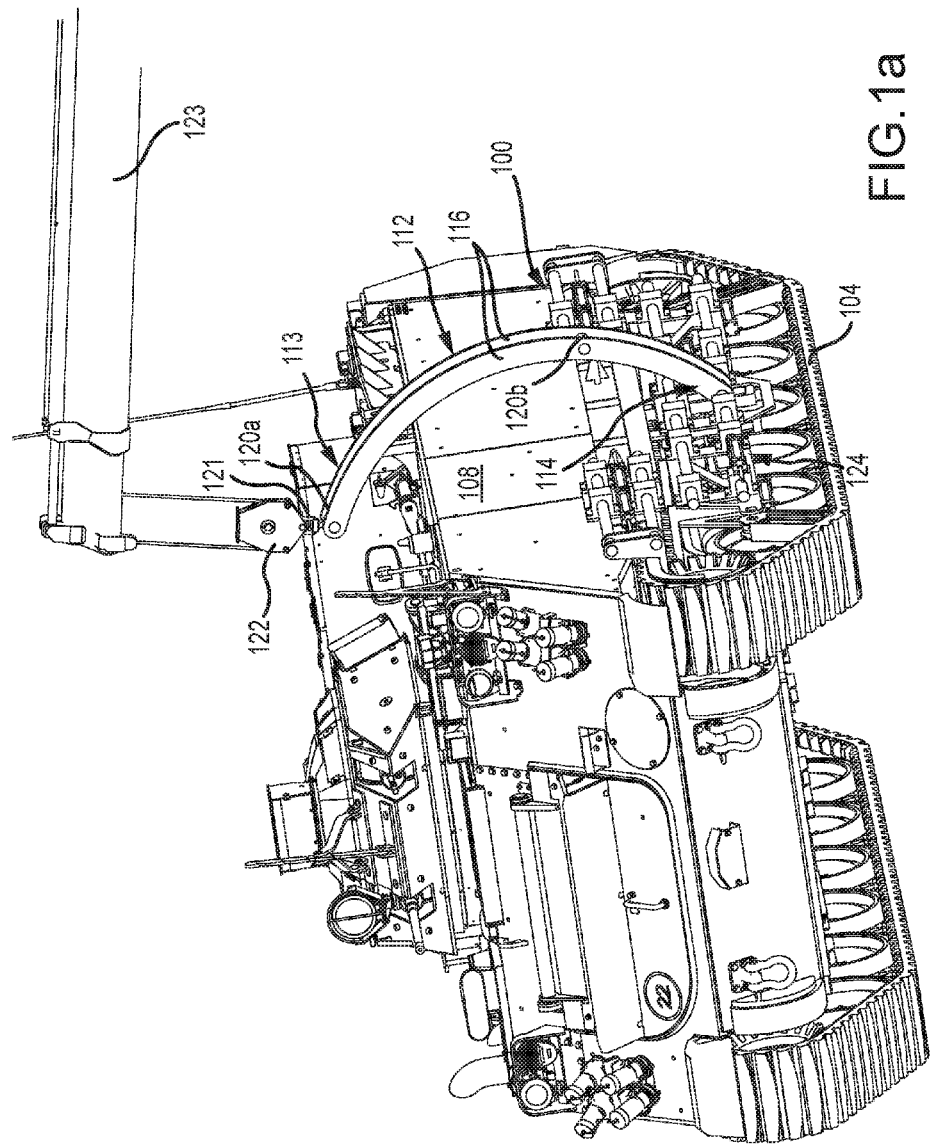

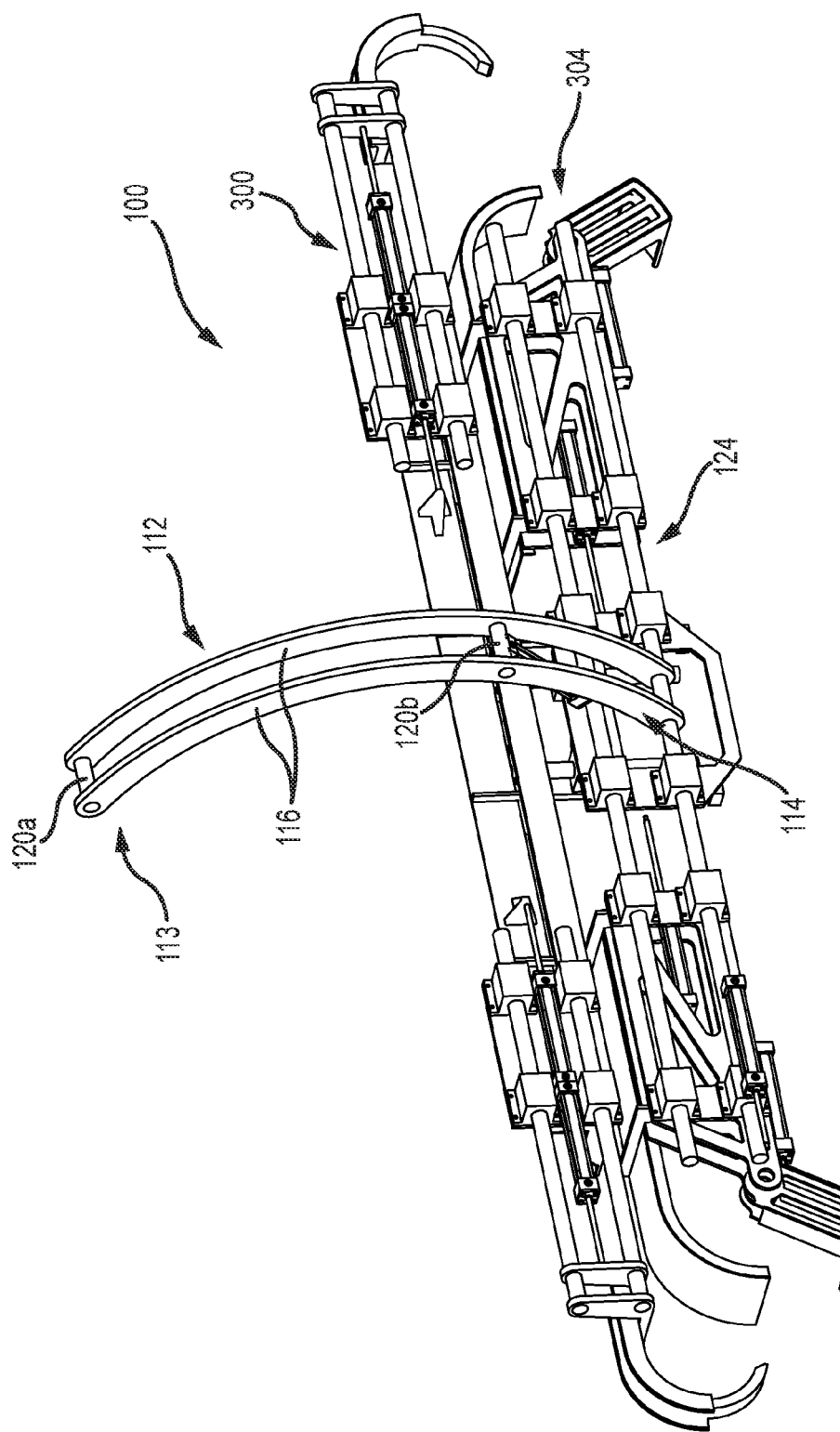

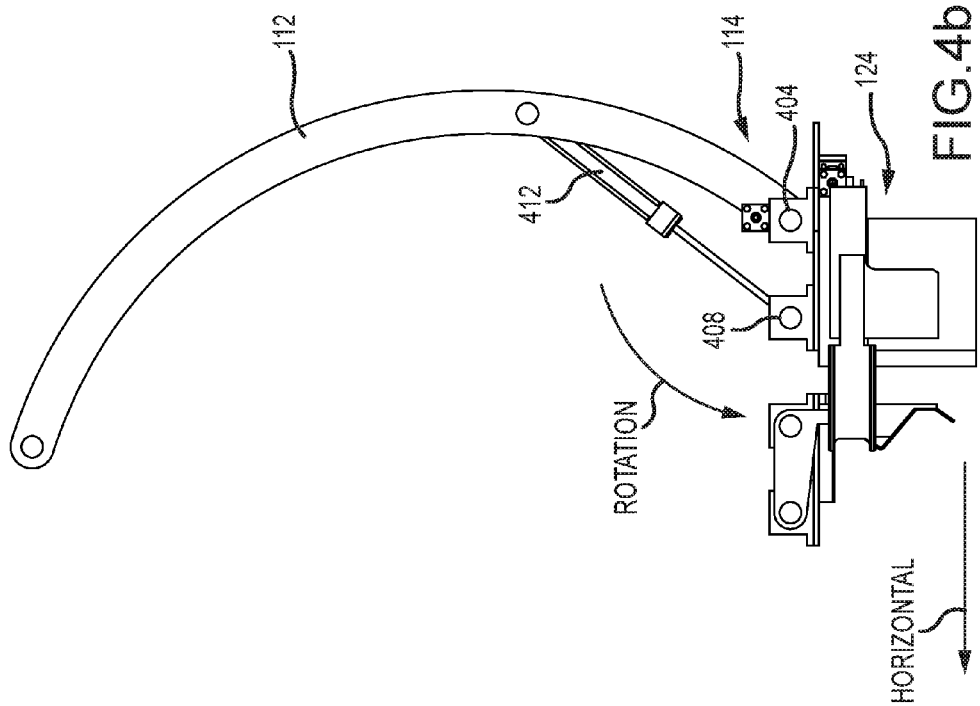
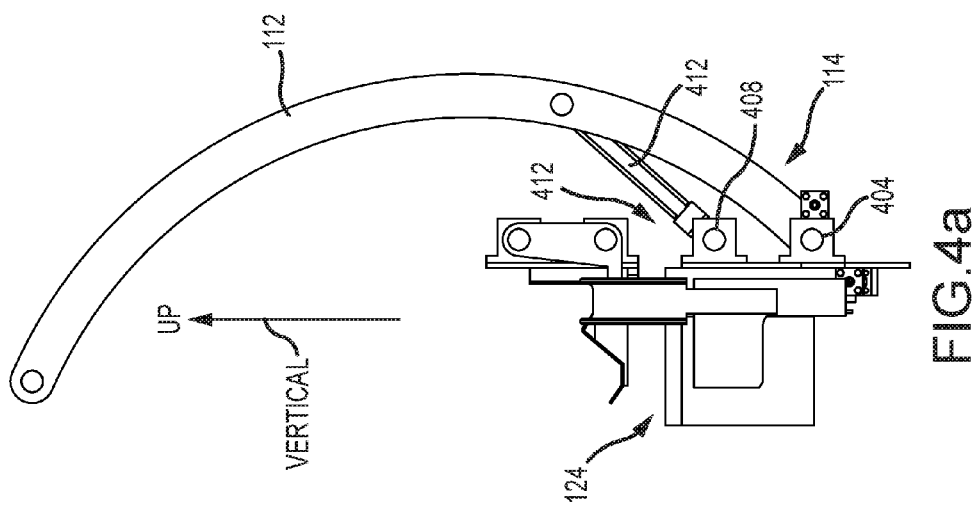

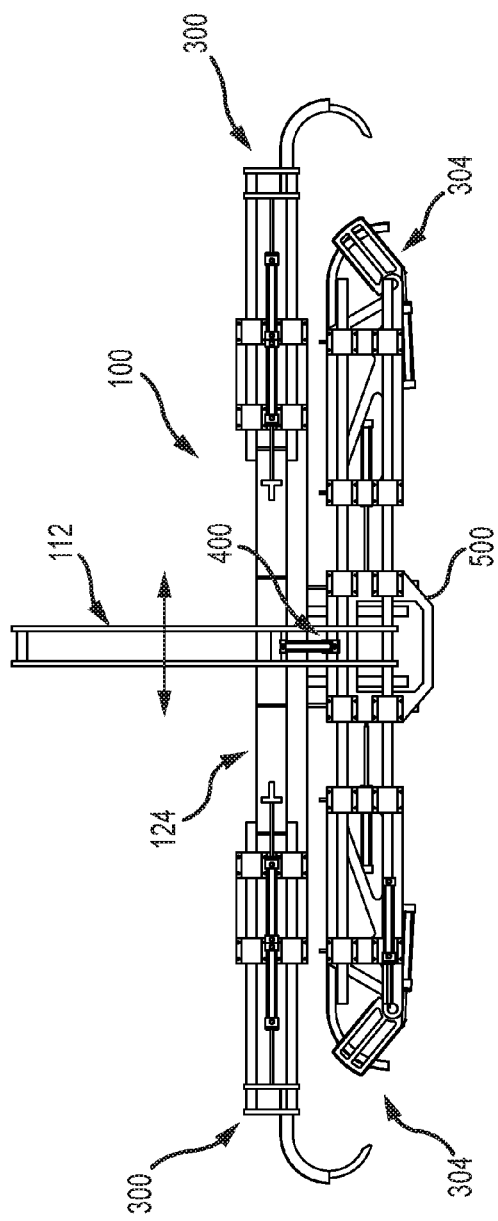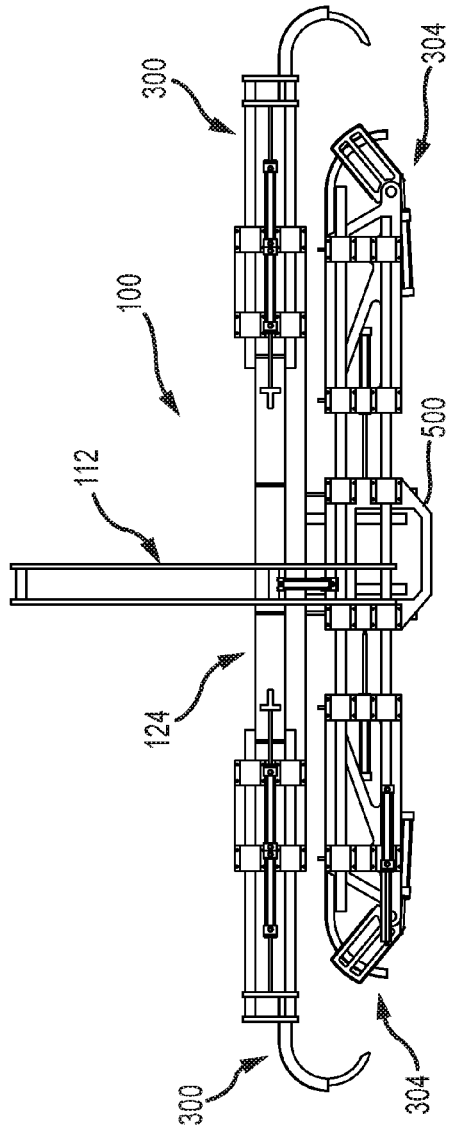

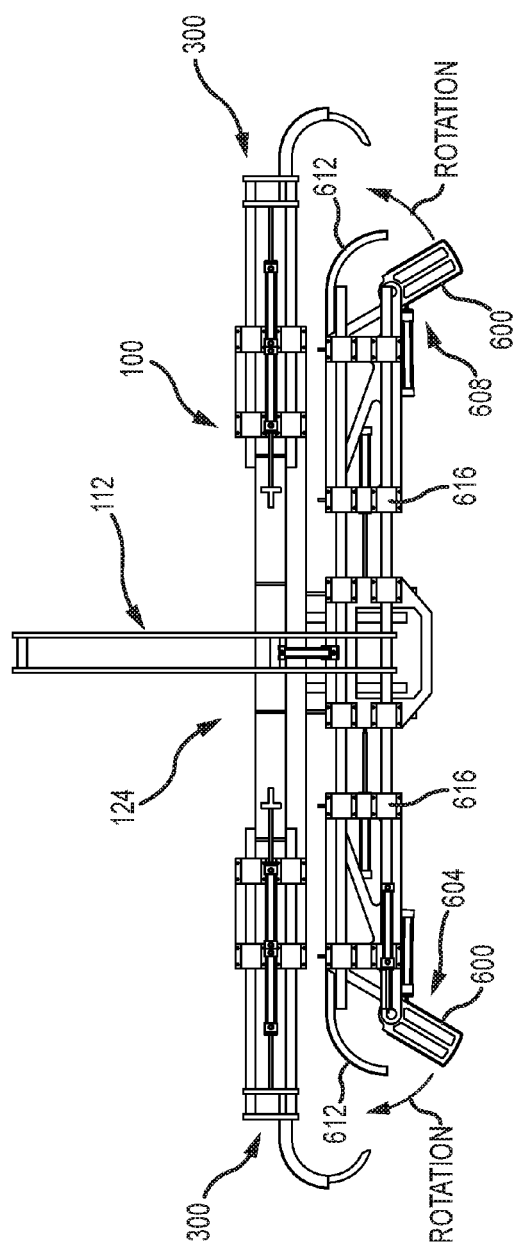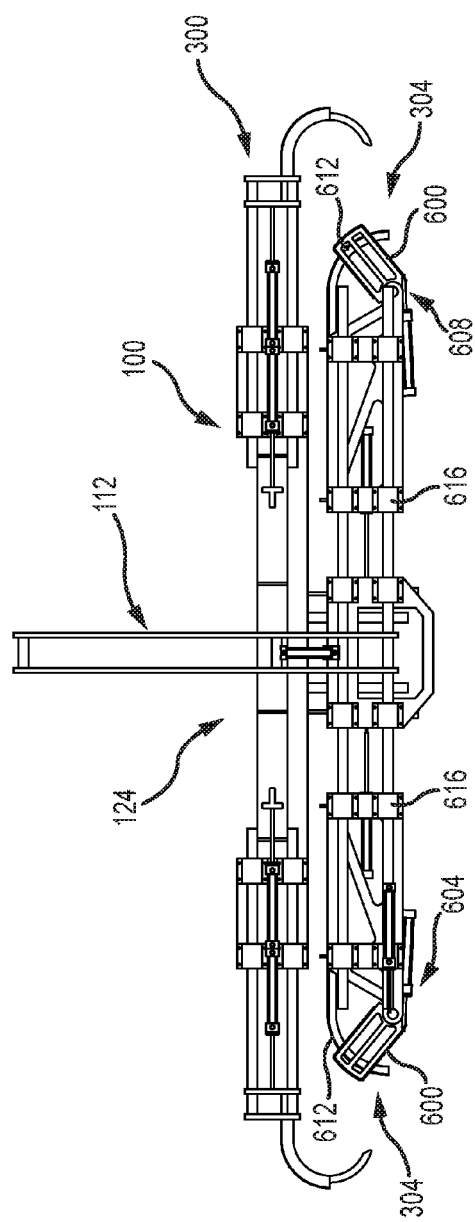

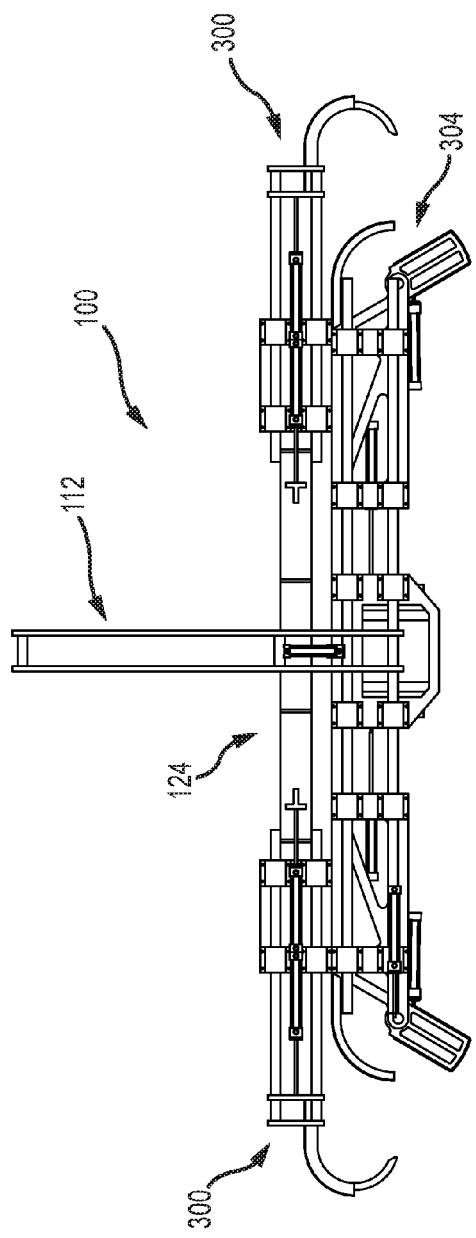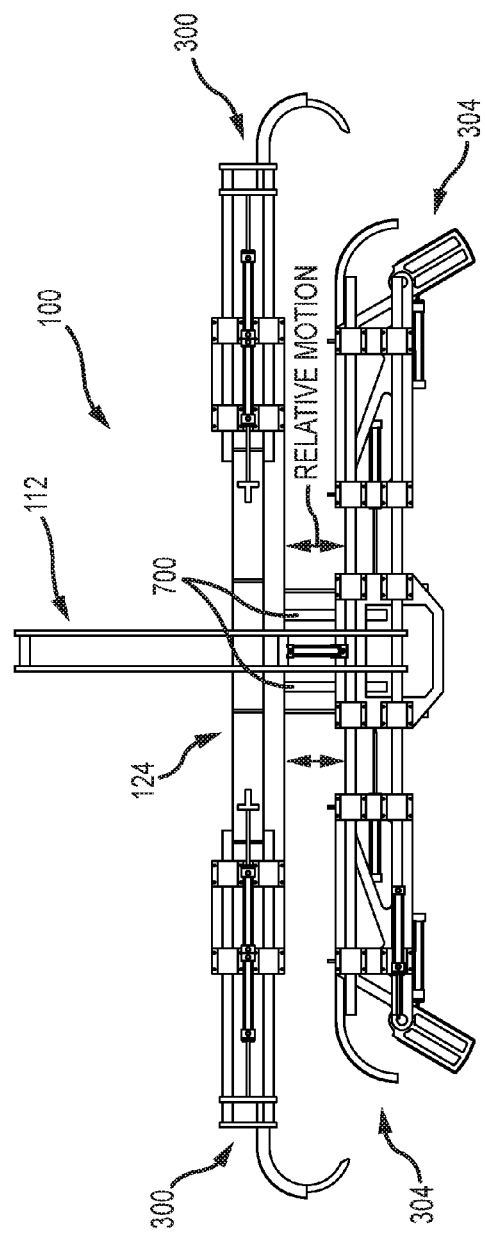

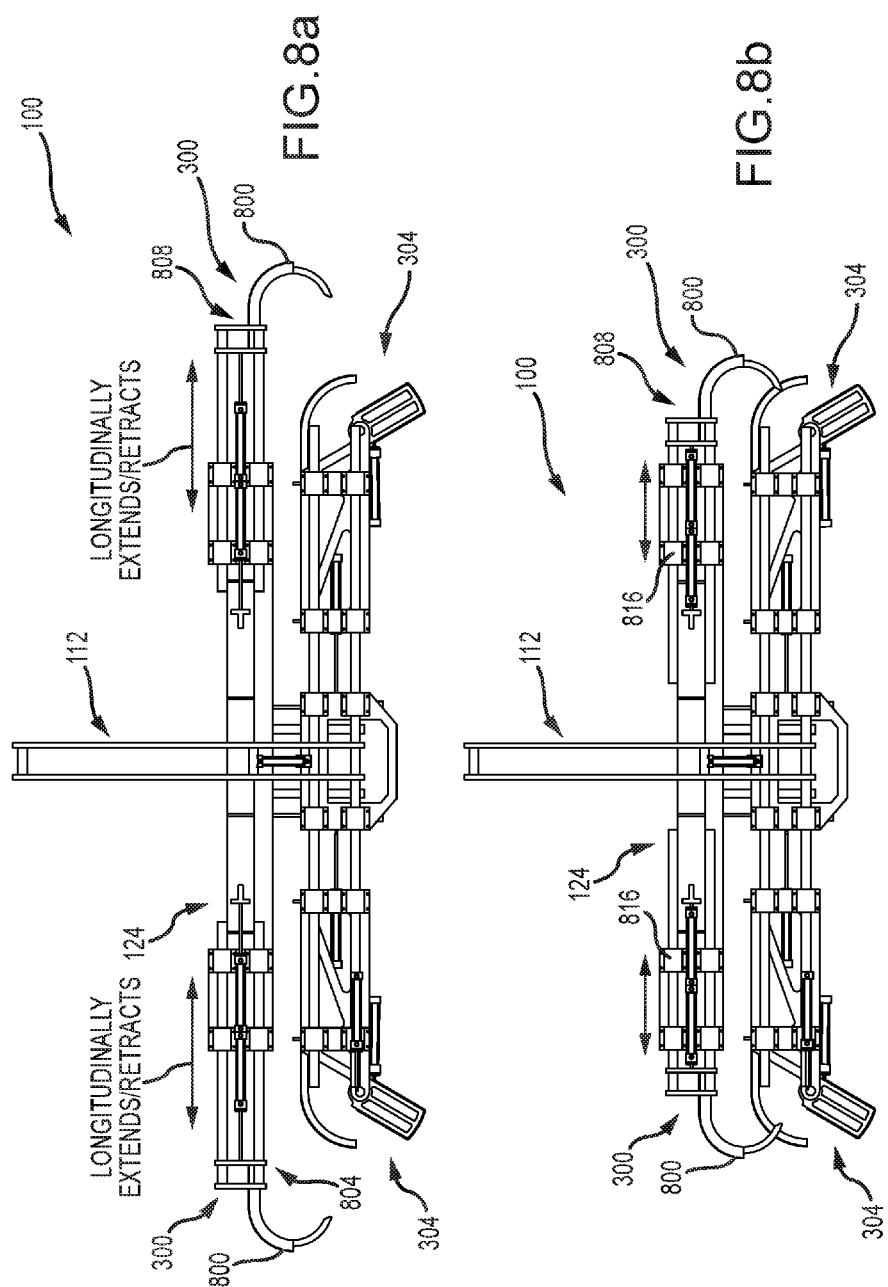

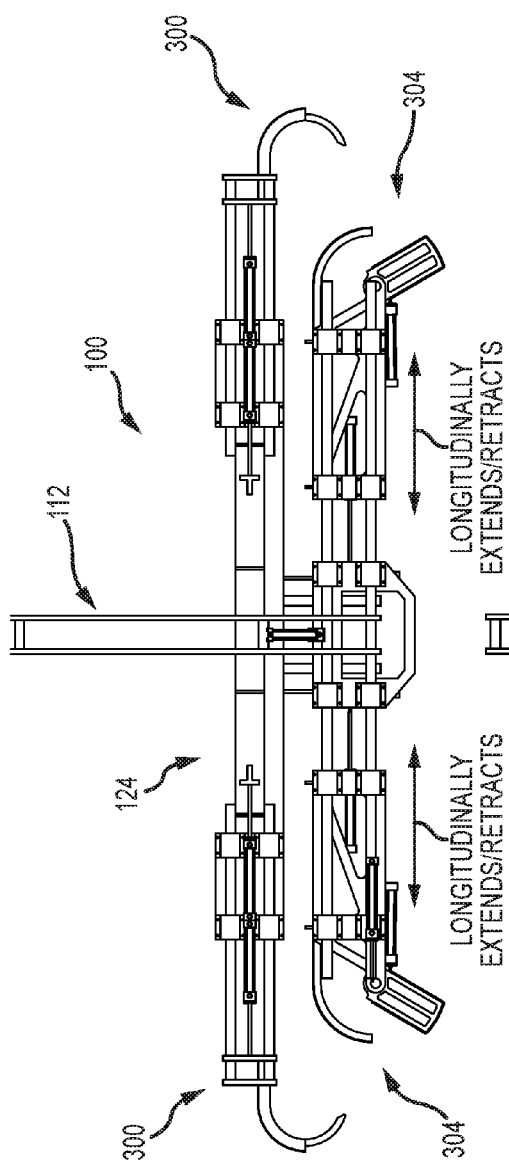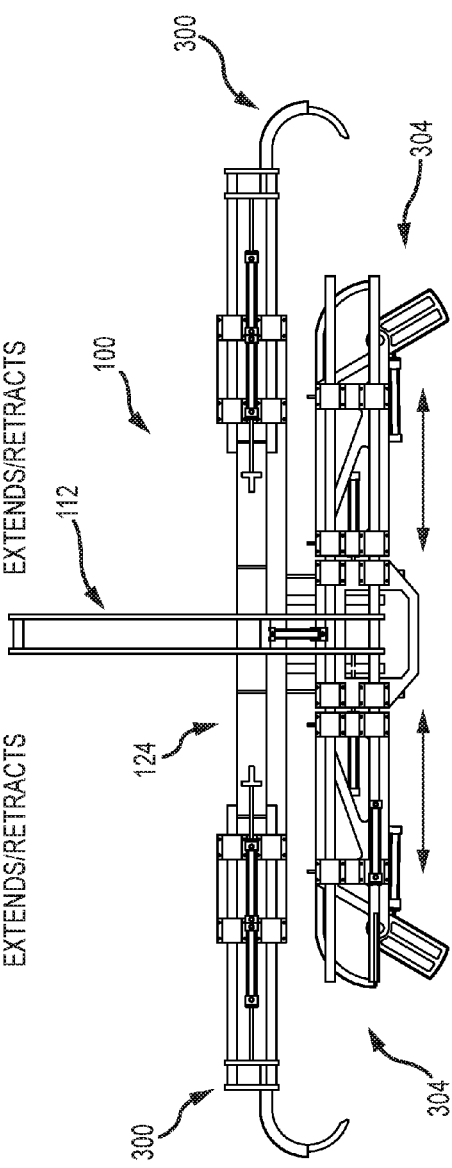

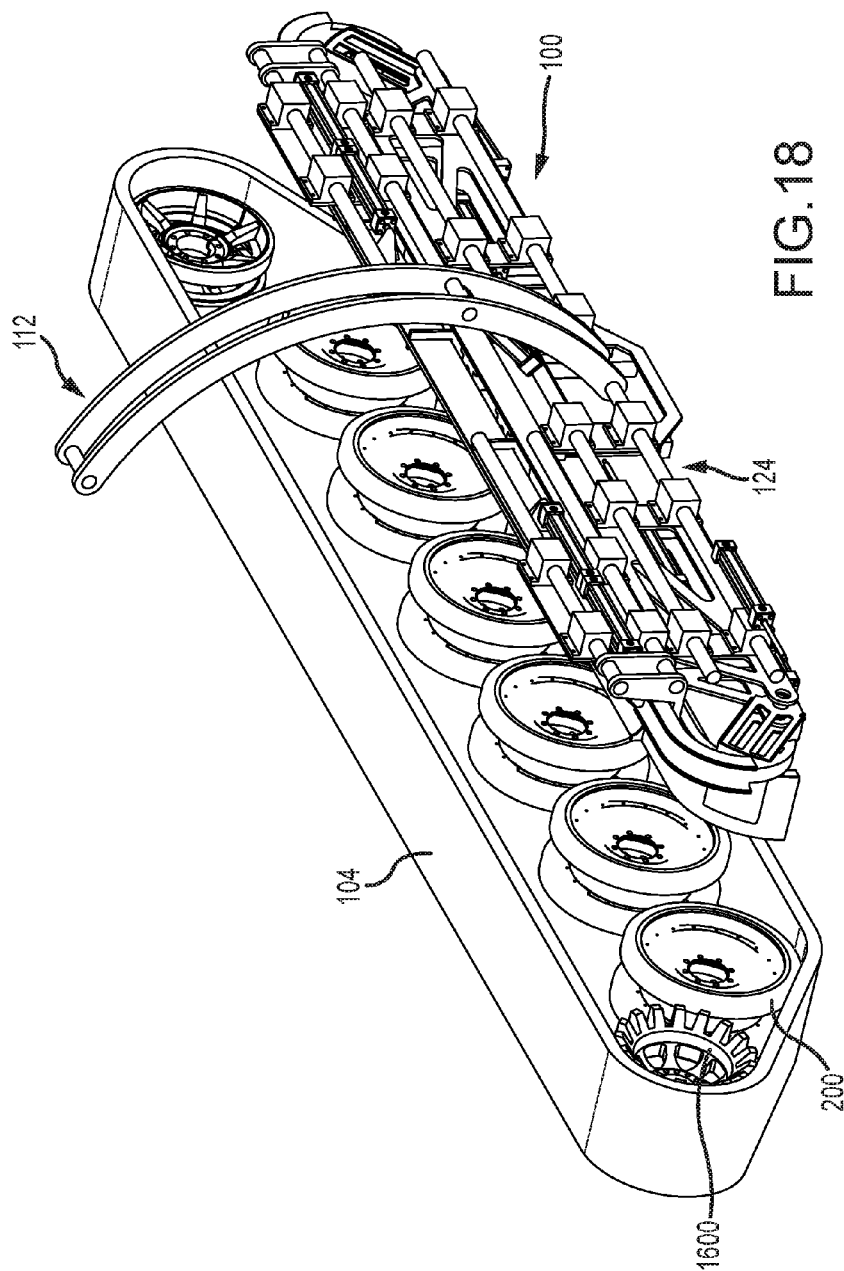

TRACK CHANGING APPARATUS AND METHODS ASSOCIATED THEREWITH

CROSS-REFERENCE TO RELATED APPLICATION

The present application claims the benefit of U.S. Provisional Patent Application No. 62/107,201, filed on Jan. 23, 2015, which is incorporated herein by reference in its entirety.

FIELD

The present invention is related to an apparatus for positioning an elastomeric endless track on a mechanical device, such as removing and/or mounting an elastomeric endless track on an armored vehicle.

BACKGROUND

Various pieces of equipment include tracks for contacting a surface underlying the equipment. By way of example, various types of construction equipment, such as bulldozers and excavators, use tracks for contacting the ground. In addition, various vehicles/weapon platforms also utilize tracks.

In the past, tracks were generally constructed from metal segments that could be disconnected. Also available on the market are rubber segments that can be fitted together to form a track. Disconnecting the segments of prior art tracks allowed removal and insertion of tracks on vehicles.

Further developments lead to elastomeric continuous band tracks, wherein such tracks are relatively new to the art. However, continuous band tracks present difficulty when being installed and removed from vehicles because they cannot be disconnected. That is, continuous band tracks may be an endless loop of rubber, elastomeric material or combinations of materials that have elastomeric properties; accordingly, the track can be tensioned, but it cannot be disconnected and/or separated into segments for installation and removal from vehicles.

As can be appreciated by those skilled in the art, changing an elastomeric endless track on one of the aforementioned pieces of equipment and/or vehicles/weapon platforms can be difficult. This is due, at least in part, to the size, weight, and/or fittings associated with the track and/or the equipment and/or vehicle/weapon platform to which it is attached. Accordingly, there is a need for additional devices, systems and/or methods that address one or more of the problems or shortcomings noted above.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

A track changing apparatus for changing a track on an armored vehicle includes a plurality of movable elements. The plurality of movable elements of the track changing apparatus allows a track to be manipulated from loose or unmounted state, to a tensioned state wherein the track is located on the track changing apparatus, and finally, to a fully mounted state wherein the track has been transferred onto the armored vehicle.

Accordingly, an apparatus for changing an elastomeric endless track on an armored vehicle, the apparatus comprising:
a hoist member; and
a main frame interconnected to the lower end of the hoist member, the main frame selectively rotatable between 0 to 120 degrees from vertical, the main frame including:
a variable length upper beam member including upper beam framing interconnecting a first track spreader at a first longitudinal end of the variable length upper beam member and a second track spreader at a second longitudinal end of the variable length upper beam member, wherein the first and second track spreaders are independently and selectively positionable at any position between and including a longitudinally extended position and a longitudinally retracted position;
a variable length lower beam member interconnected to the variable length upper beam member, the variable length lower beam member including lower beam framing interconnecting first and second road wheel guides situated at corresponding first and second longitudinal ends of the variable length lower beam member, wherein the first and second road wheel guides are selectively positionable at any position between and including a longitudinally extended position and a longitudinally retracted position, the variable length lower beam member further including first and second rotatable standoffs interconnected to the lower beam framing, wherein said first and second rotatable standoffs are selectively positionable at any position between and including a lowered position and an upward position; and
a plurality of variable height connectors interconnecting the variable length upper beam member to the variable length lower beam member, the plurality of variable height connectors selectively positionable at any position between and including an expanded position and a collapsed position;
wherein the main frame is configured for contacting the elastomeric endless track for mounting the elastomeric endless track to the armored vehicle or removing the elastomeric endless track from the armored vehicle.

In at least one embodiment, the hoist member includes a concave shape between an upper end and a lower end of the hoist member.

In at least one embodiment, the hoist member comprises an upper lifting bar.

In at least one embodiment, the hoist member includes at least two interconnected arcuate-shaped members.

In one embodiment an apparatus for changing an elastomeric endless track on an armored vehicle is provided, the apparatus comprising:
a hoist member including a concave shape between an upper end and a lower end of the hoist member, the hoist member further including an upper lifting bar; and
a main frame interconnected to the lower end of the hoist member, the main frame selectively rotatable relative to the hoist member between a substantially vertical position and a substantially horizontal position, the main frame including:
a variable length upper beam member including upper beam framing interconnecting a first track spreader at a first longitudinal end of the variable length upper beam member and a second track spreader at a second longitudinal end of the variable length upper beam member, wherein the first and second track spreaders are independently and selectively positionable at any position between and including a longitudinally extended position and a longitudinally retracted position;

a variable length lower beam member interconnected to the variable length upper beam member, the variable length lower beam member including lower beam framing interconnecting first and second road wheel guides situated at corresponding first and second longitudinal ends of the variable length lower beam member, wherein the first and second road wheel guides are selectively a longitudinally extended position and a longitudinally retracted position, the variable length lower beam member further including first and second rotatable standoffs interconnected to the lower beam framing, wherein said first and second rotatable standoffs are selectively positionable at any position between and including a lowered position and an upward position; and a plurality of variable height connectors interconnecting the variable length upper beam member to the variable length lower beam member, the plurality of variable height connectors selectively positionable at any position between and including an expanded position and a collapsed position;

wherein the main frame is configured for contacting the elastomeric endless track for mounting the elastomeric endless track to the armored vehicle or removing the elastomeric endless track from the armored vehicle.

A method of using the track changing apparatus is also described herein. Accordingly, a method of installing a track on an armored vehicle is provided, the method comprising:

engaging a track changing apparatus with an elastomeric endless track, the engaging including contacting a plurality of powered movable members of the track changing apparatus with the elastomeric endless track to cause the elastomeric endless track to be placed in tension;

advancing the track changing apparatus toward the armored vehicle to place the elastomeric endless track in mounting proximity with the armored vehicle;

adjusting tension in the elastomeric endless track by moving at least some of the plurality of powered movable members such that the elastomeric endless track at least partially engages the armored vehicle; and disengaging the track changing apparatus from the elastomeric endless track such that the elastomeric endless track is attached to the armored vehicle.

In at least one embodiment, the method further comprises positioning the elastomeric endless track on the ground adjacent the armored vehicle before engaging the track changing apparatus with the elastomeric endless track. In at least one embodiment, the method further comprises tilting a main frame of the track changing apparatus away from a hoist member of the track changing apparatus to facilitate alignment of the main frame with the elastomeric endless track located on the ground. In at least one embodiment, the step of adjusting tension in the elastomeric endless track by moving at least some of the plurality of powered movable members includes rotating a pair of standoffs away from contacting the elastomeric endless track. In at least one embodiment, the step of disengaging the track changing apparatus from the elastomeric endless track includes reducing a longitudinal length of an upper beam of the track changing apparatus. In at least one embodiment, the step of disengaging the track changing apparatus from the elastomeric endless track includes reducing a longitudinal length of a lower beam of the track changing apparatus. In at least one embodiment, the step of disengaging the track changing apparatus from the elastomeric endless track includes reducing a spacing between an upper beam and a lower beam of the track changing apparatus. In at least one embodiment, following the disengaging step, withdrawing the track changing apparatus from adjacent the elastomeric endless track and the armored vehicle.

Various components are referred to herein as "operably associated." As used herein, "operably associated" refers to components that are linked together in operable fashion, and encompasses embodiments in which components are linked directly, as well as embodiments in which additional components are placed between the two linked components.

At least one embodiment of the one or more embodiments of the one or more present inventions may be used to place or change an elastomeric endless track on a piece of equipment and/or vehicle/weapon platform. By way of non-limiting examples, the piece of equipment may be a piece of construction equipment; alternatively, it may be a vehicle, such as a type of armored personnel carrier; or it may be a weapon or weapon platform, such as a tank. Such foregoing equipment is hereinafter referred to as an "armored vehicle."

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the one or more present inventions, a more particular description of the one or more present inventions is rendered by reference to specific embodiments thereof which are illustrated in the appended drawings. It should be appreciated that these drawings depict only typical embodiments of the one or more present inventions and are therefore not to be considered limiting of its scope. The one or more present inventions are described and explained with additional specificity and detail through the use of the accompanying drawings in which:

FIGS. 1a-1c are perspective views of an embodiment of a track changing apparatus being used to mount an elastomeric endless track to an armored vehicle (while vehicles with six road wheels per side are shown, it is to be understood that this is just an illustrated example of a piece of equipment that may have an endless track mounted or removed from it using the track changing apparatus; accordingly, a variety of other vehicles, including but not limited to, vehicles with five or seven road wheels per side are also pieces of equipment that may have an endless track mounted or removed from it using the track changing apparatus);

FIG. 3 is a perspective view of the track changing apparatus of FIG. 2, without the track or the road wheels of an armored vehicle (also not shown);

FIGS. 4a-9b are various views of the track changing apparatus of FIG. 3, wherein modes of manipulation of the track changing apparatus are illustrated;

FIGS. 11-18 are step-by-step perspective views of the elastomeric endless track of FIG. 10 being mounted on the road wheels of an armored vehicle (not shown) using an embodiment of the track changing apparatus described herein.

The drawings are not necessarily to scale.

DETAILED DESCRIPTION

One or more embodiments of the one or more inventions described herein include a powered beam with several modes of selective adjustability, thereby allowing powered manipulation of a track for placement of the track onto an armored vehicle. One or more embodiments of the one or more inventions described herein include a method of mounting a track onto an armored vehicle. In addition, the track changing apparatus may be used to remove a track from an armored vehicle. The track includes one or more rubber or elastomeric components that allow the track to be tensioned by the track changing apparatus. In at least one embodiment, the track is an endless loop of one or more materials.

Figure 1B:
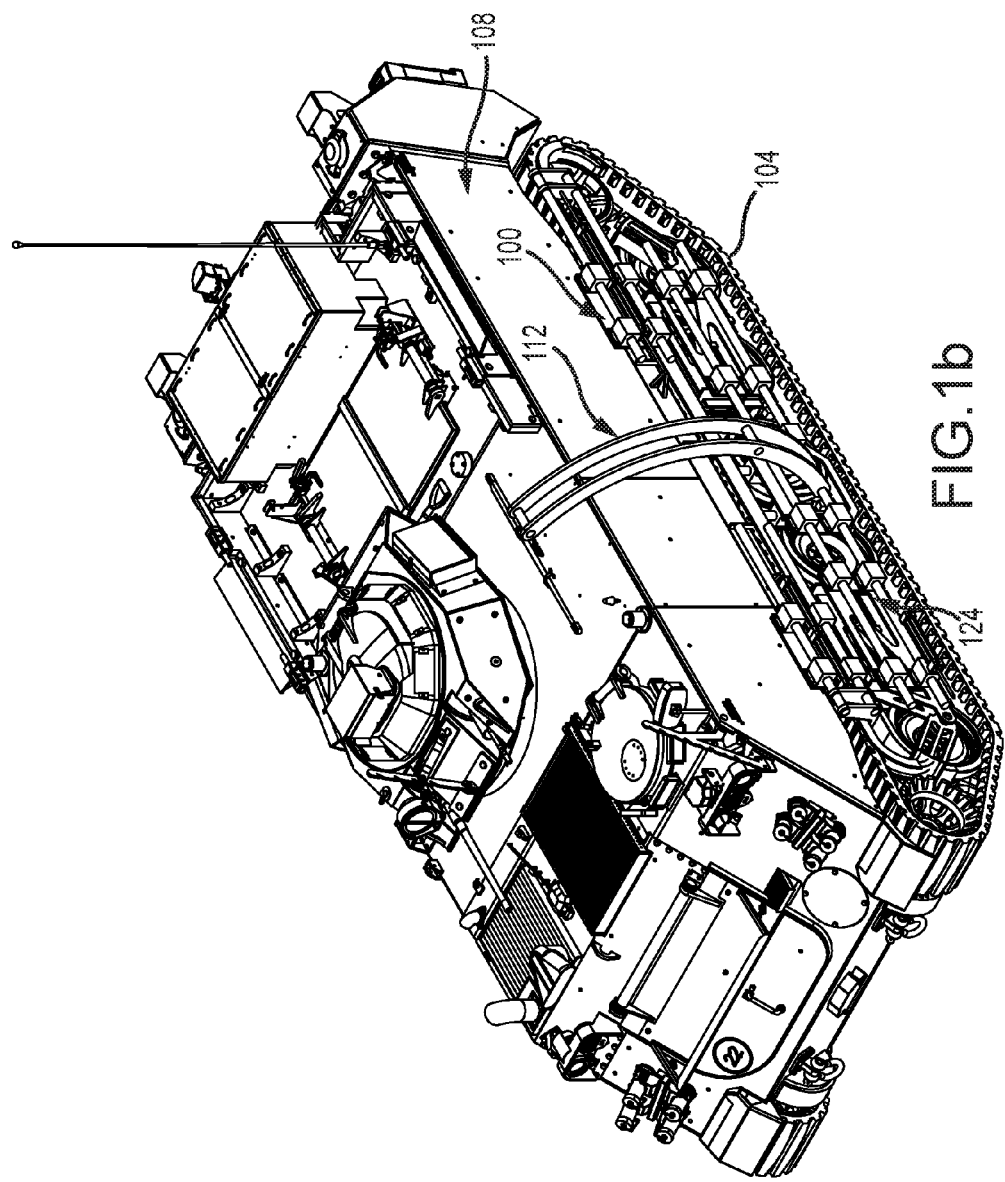
Figure 1C:
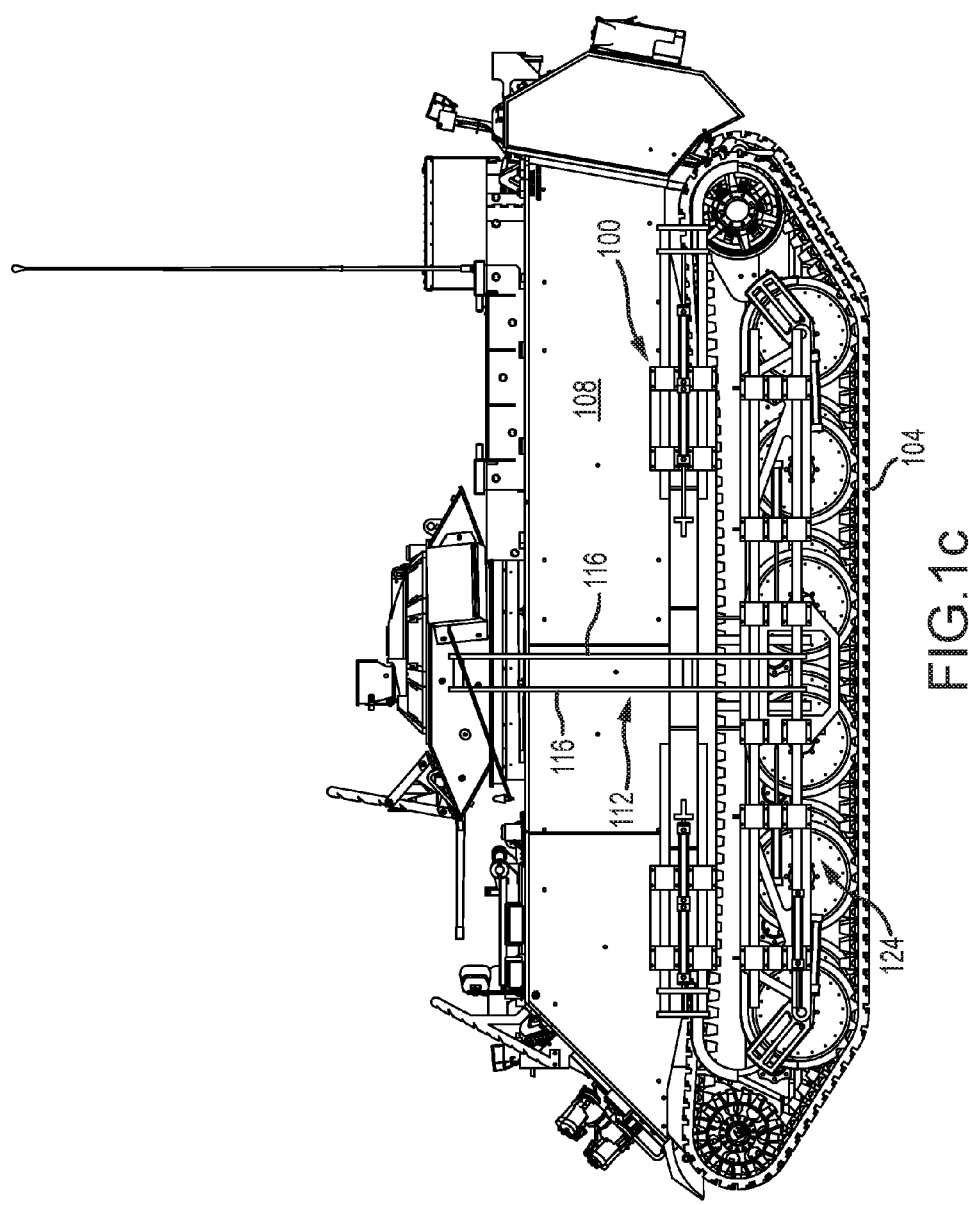

Referring now to FIG. 1a-1c, track changing apparatus 100 is shown in use to mount a track 104 to an armored vehicle 108. In at least one embodiment, the track changing apparatus 100 includes a hoist member 112. The hoist member 112 may be non-linear from an upper portion 113 to a lower end portion 114. By way of example, the hoist member 112 may be curved or include one or more bends. More particularly, in at least one embodiment, the hoist member 112 may include a concave or hollowed interior geometry located on a side facing the armored vehicle (that is, the side facing one or more longitudinal members of the track changing apparatus 100). As depicted in the example embodiment shown in FIG. 1a, the hoist member 112 includes a pair of arcuate-shaped members 116 joined by a plurality of cross members 120a and 120b. An upper cross member 120a is shown attached to a hook 121 of a lifting pulley 122, which in turn is interconnected to a lifting hoist 123. The concave or curved shape of the hoist member 112 enables the main frame 124 of the track changing apparatus 100 to be placed in a mounting position with the armored vehicle 108, and yet still provide clearance for the track changing apparatus 100 to be lifted from overhead with adequate clearance for the hoist member 112 to avoid contacting the sides of the armored vehicle 108.

Figure 2:
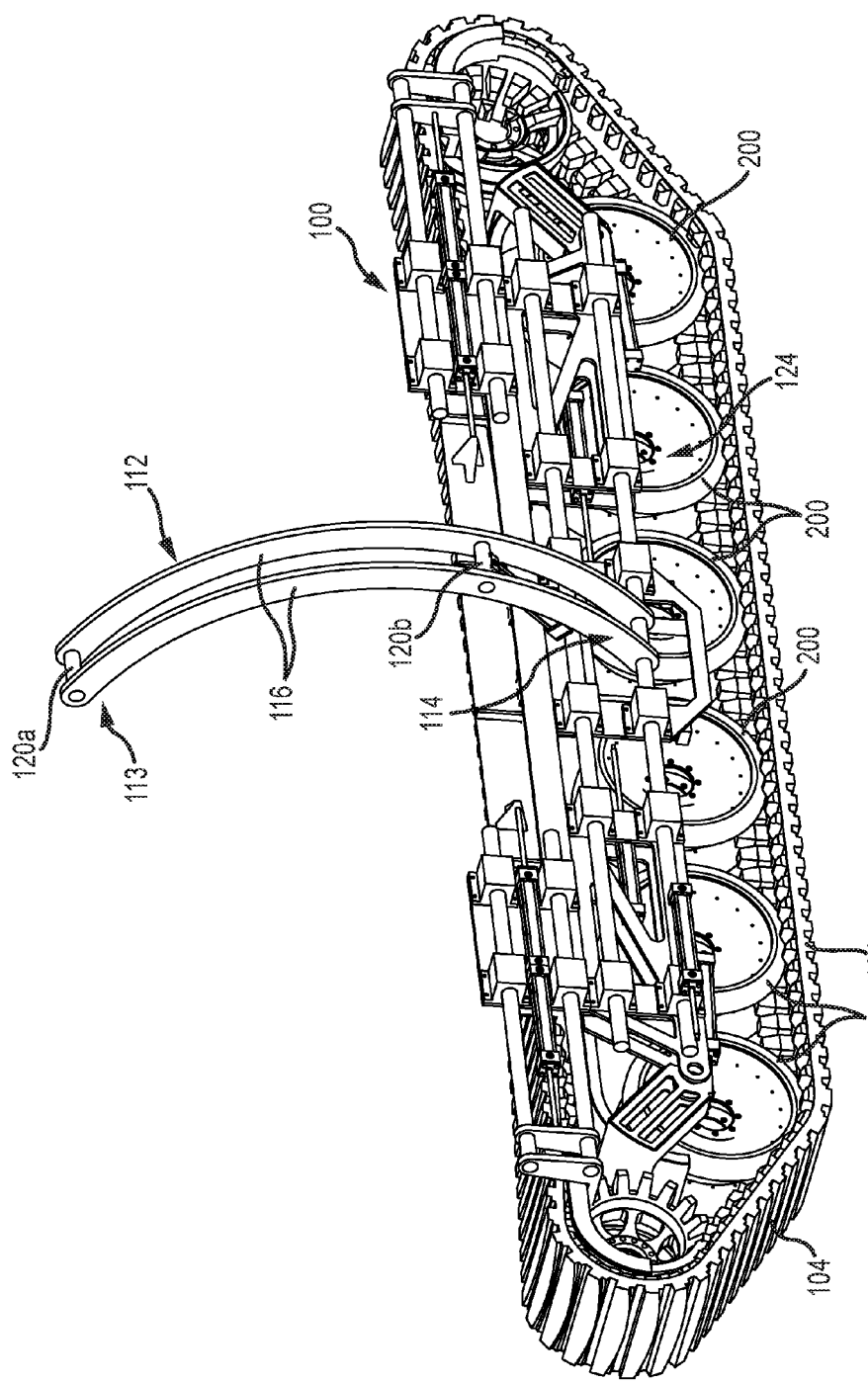
FIG. 2 is a perspective view of the track changing apparatus depicted in FIG. 1, wherein the track changing apparatus is operatively associated with an elastomeric endless track, and is further shown proximate the road wheels of an armored vehicle (not shown)

Referring now to FIG. 2, a lower portion of the hoist member 112 is attached to the main frame 124 of the track changing apparatus 100. As depicted in FIG. 2, the track changing apparatus 100 can be used to position a track 104 in coupling engagement with the relevant structure of an armored vehicle 108, including the road wheels 200 of the armored vehicle 108.

FIG. 3 illustrates the track changing apparatus 100 of FIG. 2 without the track 104 or the road wheels 200 of the armored vehicle 108. As can be seen in FIG. 3, the main frame 124 of the track changing apparatus 100 includes an upper beam member 300 interconnected to a lower beam member 304.

Referring now to FIGS. 4a and 4b, in at least one embodiment the hoist member 112 is interconnected to the lower beam member 304 using a rotatable connection 400. As can be seen when comparing FIG. 4a to FIG. 4b, the rotatable connection 400 allows the hoist member 112 to maintain a substantially vertical orientation while the main frame 124 is rotatable relative to the hoist member 112. That is, the main frame 124 can be selectively tilted, such as between a horizontal and vertical orientation (and any angle between horizontal and vertical) while maintaining a substantially vertical orientation of the hoist member 112. In at least one embodiment, the main frame 124 may be selectively rotated greater than 90 degrees from horizontal, such as, by way of example, up to 120 degrees, such that the track changing apparatus 100 can accommodate sloping ground conditions, if present. In at least one embodiment, the rotatable connection 400 includes a hinge 404, such as a pin, to permit rotation of the main frame 124 relative to the lower portion 114 of the hoist member 112. A second hinge 408 may also be provided between a hydraulic cylinder 412 and the main frame 124.

Referring now to FIGS. 5a and 5b, in at least one embodiment the hoist member 112 is further adjustable right and left relative to the main frame 124 of the track changing apparatus 100. More particularly, carriage member 500, which includes the rotatable connection 400 described above, allows the hoist member 112 to be selectively shifted to the right or to the left relative to the main frame 124, thereby allowing longitudinal adjustability for balancing and leveling of the track 104 along the length of the main frame 124 of the track changing apparatus 100. The carriage member 500 may include one or more hydraulic cylinders that can be selectively controlled to adjust the relative position of the hoist member 112 to the main frame 124.

Referring now to FIGS. 6a and 6b, and in accordance with at least one embodiment, the lower beam member 304 of the main frame 124 includes first and second rotatable standoffs 600. The first rotatable standoff 600 is located at or near a first end 604 of the lower beam member 304 and the second rotatable standoff 600 is located at or near a second end 608 of the lower beam member 304. The first and second rotatable standoffs 600 are used to create clearance for the track to be placed around (or removed from) the road wheels of the armored vehicle. FIG. 6a depicts the first and second rotatable standoffs 600 in a first or lowered position, thereby creating separation between the track and the road wheels. FIG. 6b depicts the first and second rotatable standoffs 600 in a second or upward position, wherein the second or upward position releases tension in the track allowing the track to engage the road wheels. Hydraulic cylinders are used to actuate the rotatable standoffs 600 from a lowered position to an upward position.

Referring still to FIGS. 6a and 6b, the lower beam member 304 also preferably includes a pair of road wheel guides 612. A first road wheel guide 612 is located at or near the first end 604 of the of the lower beam member 304. In addition, a second road wheel guide 612 is located at or near the second end 608 of the lower beam member 304. The road wheel guides 612 are preferably arcuate-shaped and are slightly larger in diameter than the road wheels that they are intended to be positioned near. The road wheel guides 612 allow the main frame 124 of the track changing apparatus 100 to be positioned in proper alignment with the road wheels, thereby improving the ease of attaching or removing a track from an armored vehicle. Structural members and framing 616 form additional portions of the lower beam member 304.

Referring now to FIGS. 7a and 7b, as described above, the upper beam member 300 is interconnected to the lower beam member 304. More particularly, a plurality of beam connectors 700 interconnect the upper beam member 300 to the lower beam member 304. The plurality of beam connectors 700 include one or more mechanisms for allowing the upper beam member 300 to be moved toward and separate from the lower beam member 304. As can be appreciated, as the upper beam member 300 is moved toward the lower beam member 304, tension is removed from the track. In contrast, when the upper beam member is moved away from the lower beam member 304, tension is applied to the track. The beam connectors 700 may include one or more hydraulic cylinders that can be selectively controlled to adjust the relative position of the upper beam member 300 to the lower beam member 304.

Referring now to FIGS. 8a and 8b, and in accordance with at least one embodiment, the longitudinal length of the upper beam member 300 is selectively adjustable, thereby allowing the upper beam member 300 to be manipulated so that it can be lengthened and shortened as may be desired. The upper beam member 300 preferably includes a pair of track spreaders 800. A first track spreader 800 is located at or near a first upper beam end 804 of the of the upper beam member 300. In addition, a second track spreader 800 is located at or near a second upper beam end 808 of the of the upper beam member 300. As discussed further below, the track spreaders 800 allow the upper beam member 300 of the main frame 124 to contact and lengthen the upper portion of the track, thereby improving the ease of attaching or removing a track from an armored vehicle. Structural members and framing 816 form additional portions of the upper beam member 300.

Referring still to FIGS. 8a and 8b, the upper beam member 300 may be fully extended at both the first upper beam end 804 and a second upper beam end 808. Advantageously, the first upper beam end 804 may be separately adjustable from the second upper beam end 808. That is, the first upper beam end 804 may be lengthened and shortened to any extent within its variable length while maintaining the second upper beam end 808 in either a first lengthened position or a second shortened position or at any position therebetween. Similarly, the second upper beam end 808 may be separately adjustable from the first upper beam end 804. That is, the second upper beam end 808 may be lengthened and shortened to any extent within its variable length while maintaining the first upper beam end 804 in either a first lengthened position or a second shortened position or at any position therebetween. This independent adjustability of the upper beam member 300 permits clearance of the track in the vicinity of the sprocket of the armored vehicle that engages the track. In addition, the independent adjustability of the upper beam member 300 further permits clearance of the opposite end of the track in the vicinity of the idler of the armored vehicle to allow the track to be installed around the idler. Accordingly, the independent selectively adjustable length of the first upper beam end and the second upper beam end allows the upper portion of the track to be manipulated for attachment to or removal from an armored vehicle. The upper beam member 300 may include one or more hydraulic cylinders that can be selectively controlled to adjust the longitudinal extension and retraction of the upper beam member 300 and the associated track spreaders 800 located at each end of the upper beam member 300.

Referring now to FIGS. 9a and 9b, and in accordance with at least one embodiment, the longitudinal length of the lower beam member 304 is selectively adjustable, thereby allowing the lower beam member 304 to be manipulated so that it can be lengthened and shortened as may be desired. As shown in FIG. 9a, the lower beam member 304 may be selectively extended and retracted to properly position the road wheel guides 612 and the first and second rotatable standoffs 600. The lower beam member 304 may include one or more hydraulic cylinders that can be selectively controlled to adjust the longitudinal extension and retraction of the lower beam member 304.

Referring again to FIGS. 1a-1c, the track changing apparatus 100 can be used to attach or remove a track 104 from an armored vehicle 108. As those skilled in the art will appreciate, the armored vehicle 108 can be jacked-up, such as by using an air bag lifting kit, to gain access to the armored vehicle 108 for removal or attachment of a track 104. Alternatively, the armored vehicle 108 may otherwise be partially lifted, such as by using a crane to gain access to the armored vehicle 108 for removal or attachment of a track 104.

Figure 10:
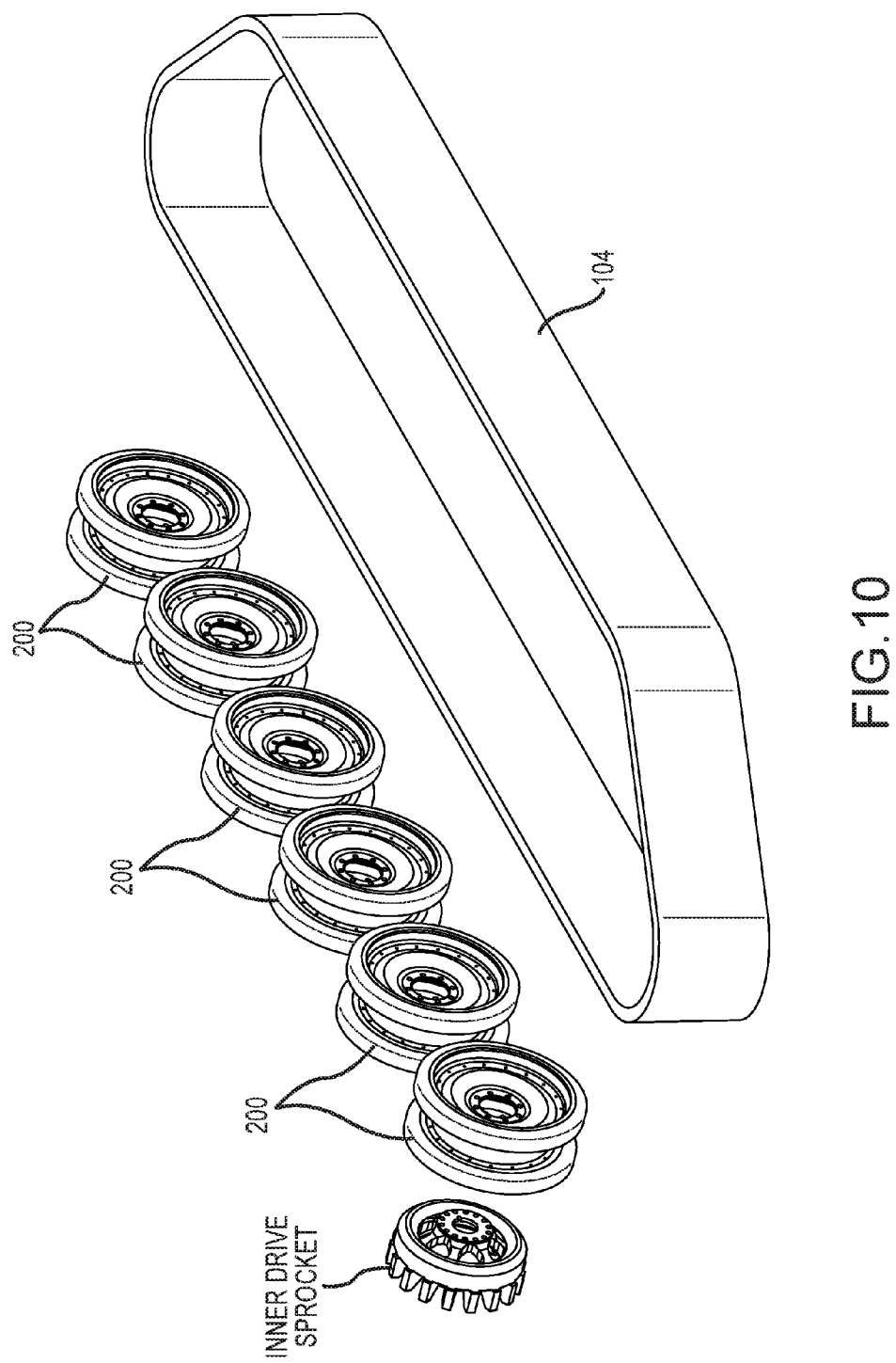
FIG. 10 is a perspective view of an elastomeric endless track lying on the ground adjacent the road wheels and inner drive sprocket of an armored vehicle (not shown)

Referring now to FIG. 10, and prior to, during or after the armored vehicle 108 is sufficiently elevated, a track 104 can be position on the ground adjacent the side of the armored vehicle.

Figure 11:
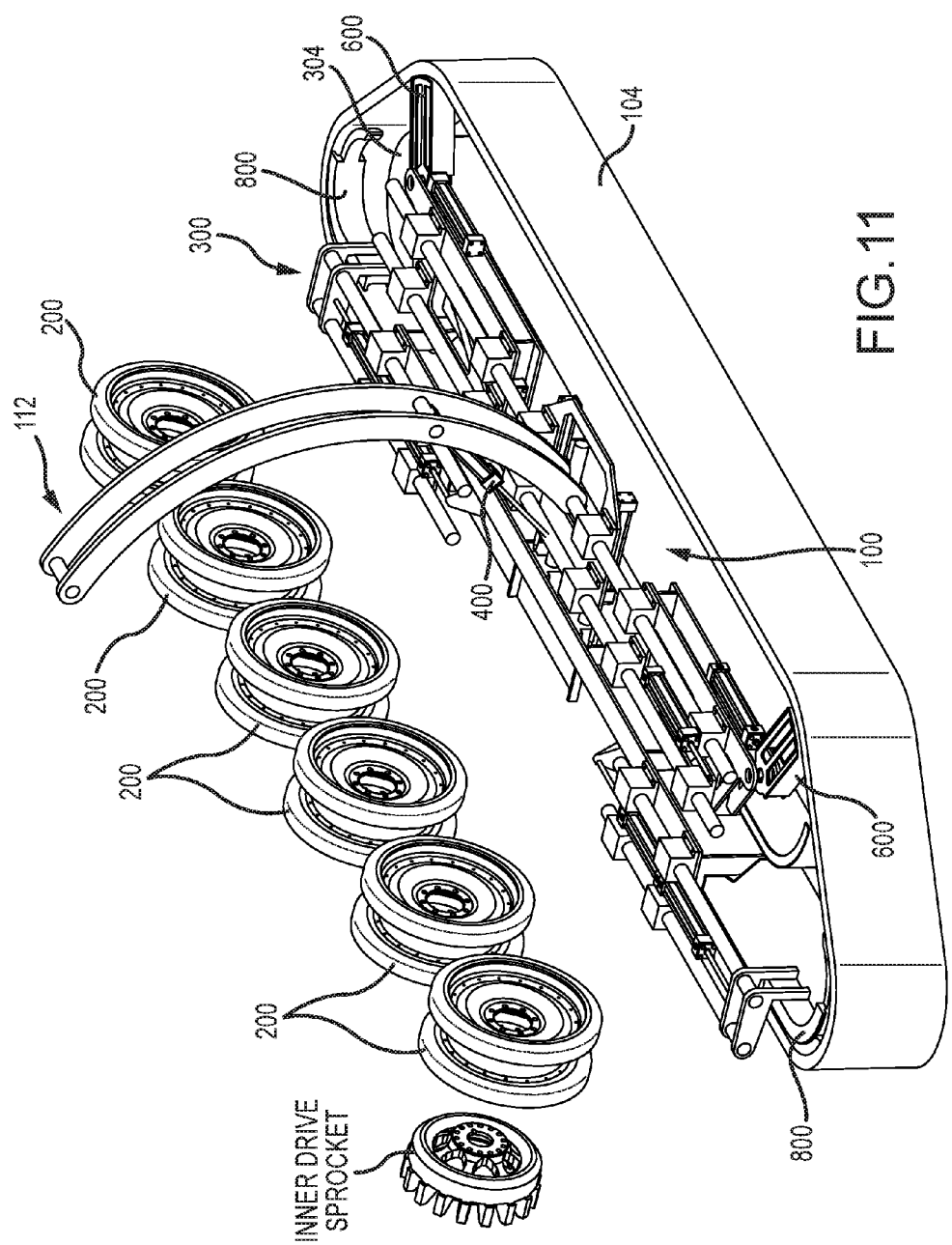

Referring now to FIG. 11, with the track changing apparatus 100 lifted using hoist member 112, the track changing apparatus 100 can be angled into position over the track 104 using the rotatable connector 400 and thereafter lowered to engage the track 104. Initially, one or more of the various components of the track changing apparatus 100 are set in a retracted position such that they do not immediately engage the track 104. Thereafter, the upper beam member 300 and lower beam member 304, the first and second rotatable standoffs 600 and the beam connectors 700 are preferably extended to cause the track changing apparatus 100 to engage the track 104 and place the track 104 in tension.

Figure 12:
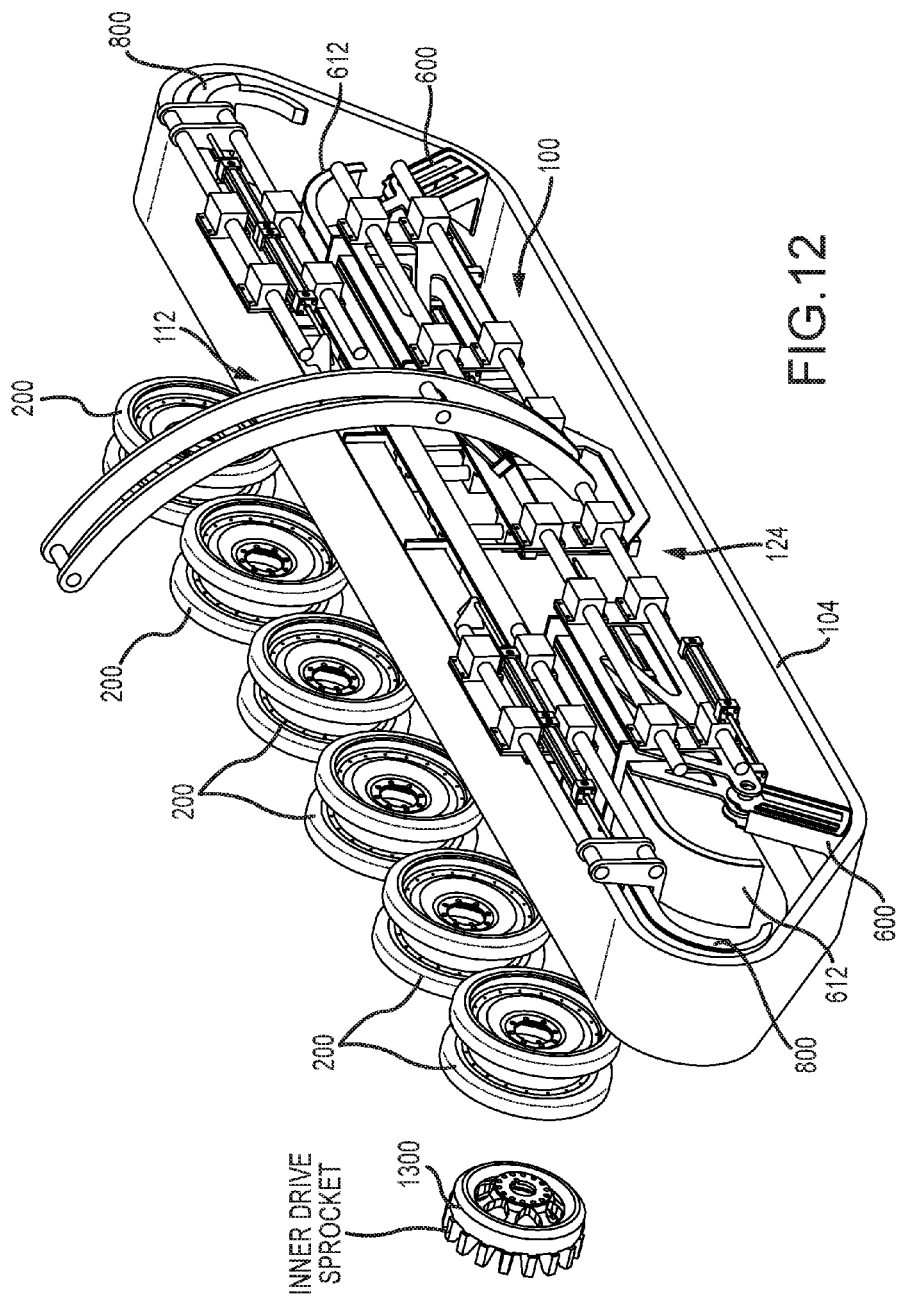

Referring now to FIG. 12, with the track 104 in tension, the main frame 124 of the track changing apparatus 100 can be rotated up so as to position the main frame 124 in substantially parallel alignment with the road wheels 200 of the armored vehicle.

Figure 13:
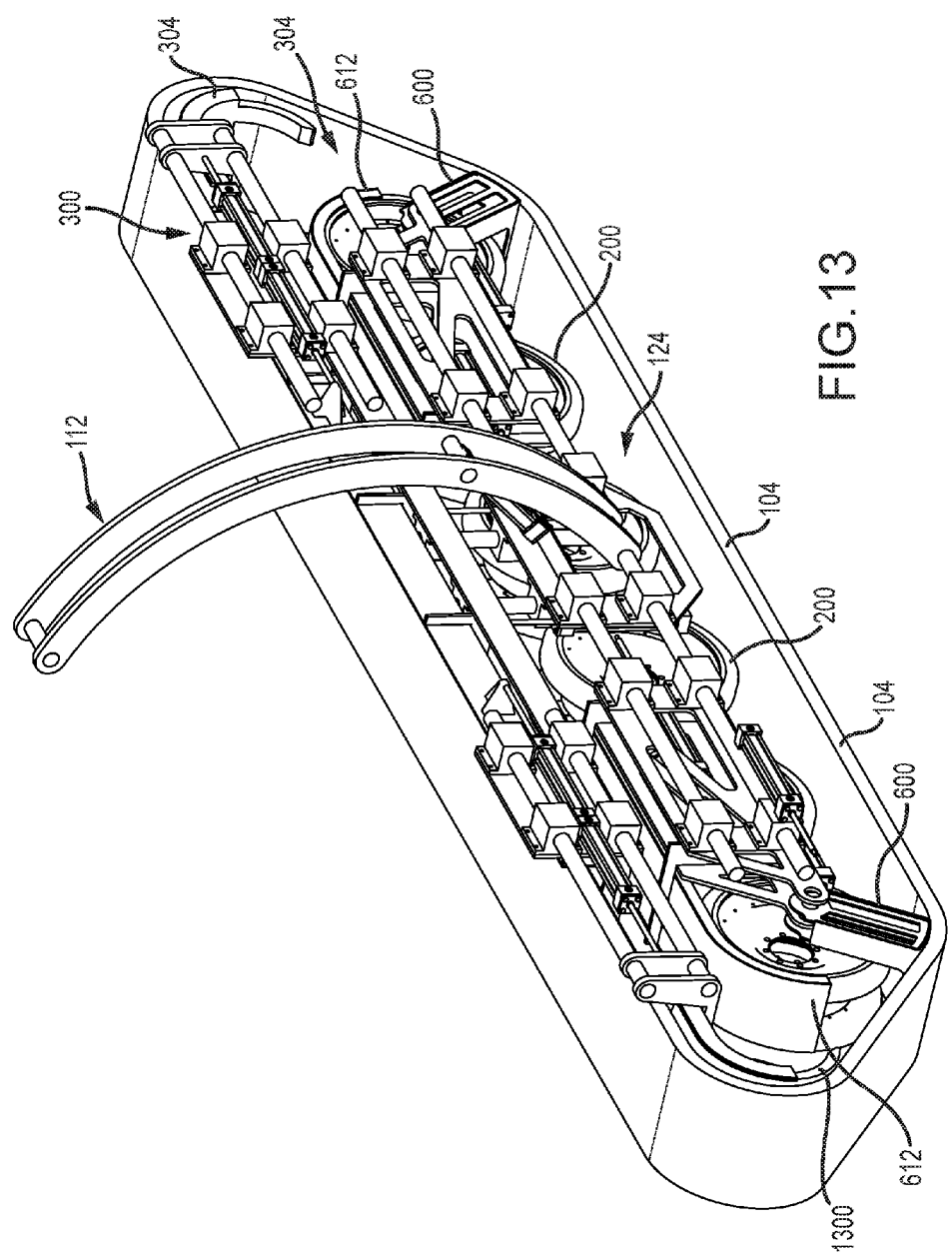

Referring now to FIG. 13, after the main frame 124 of the track changing apparatus 100 is rotated upward, the track changing apparatus 100 can be adjusted in height as needed, such as by lifting or lowering the hoist member 112 to correspondingly adjust the height of the main frame 124. In addition, the track changing apparatus 100 can be advanced laterally toward the armored vehicle by moving the hoist member 112 toward the armored vehicle. As the track changing apparatus 100 is further advanced laterally toward the armored vehicle, the road wheel guides 612 are aligned with the road wheels 200 of the armored vehicle to properly position the lower beam member 304 over the road wheels. In addition, the track 104 is also aligned onto the armored vehicle's inner drive sprocket 1300.

Figure 14:
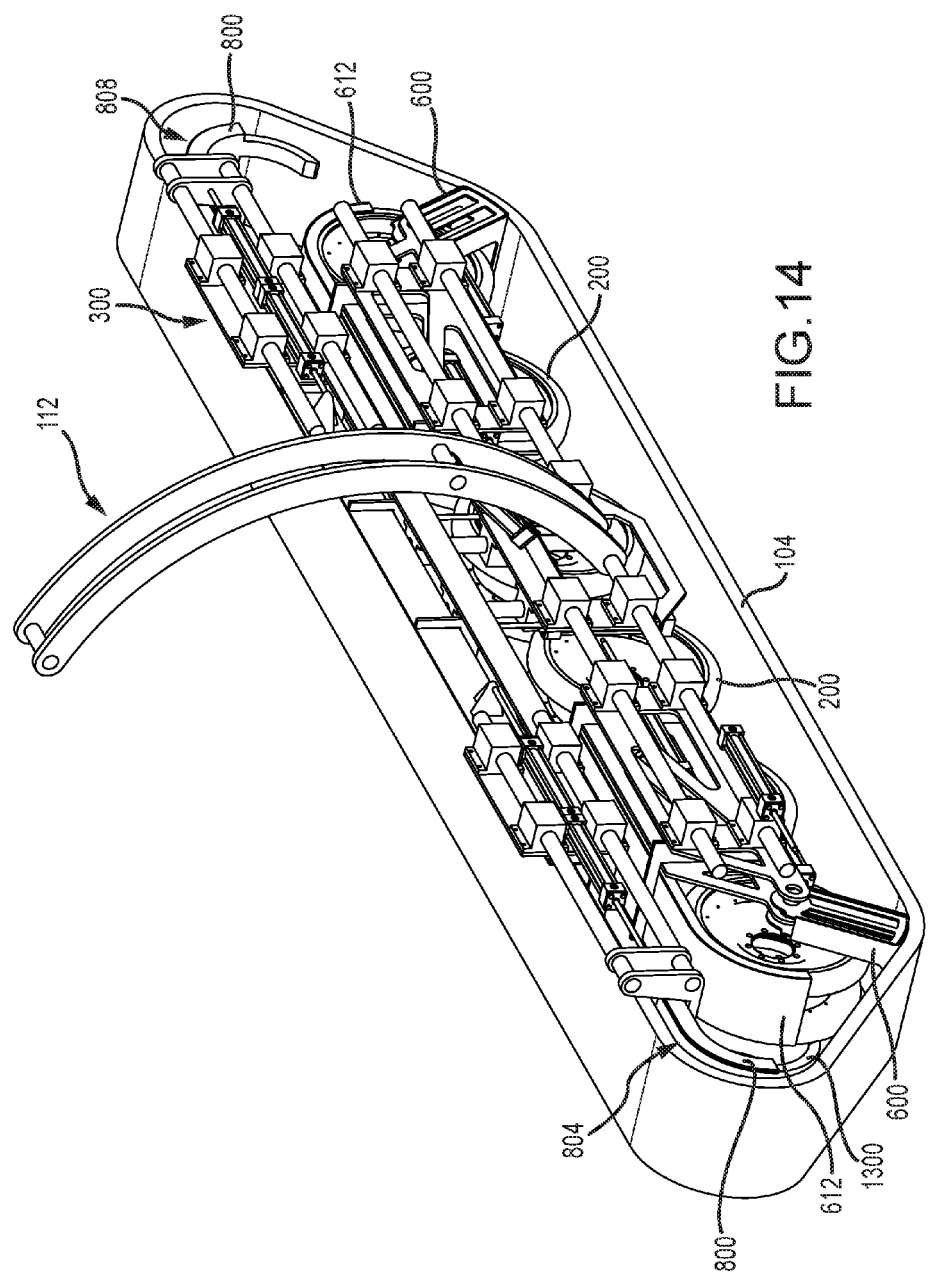

Referring now to FIG. 14, once the track changing apparatus 100 is properly aligned, then at least some tension in the track 104 is released by partially retracting the first upper beam end 804 and/or the second upper beam end 808, and thereafter the standoffs 600 are rotated upward.

Figure 15:
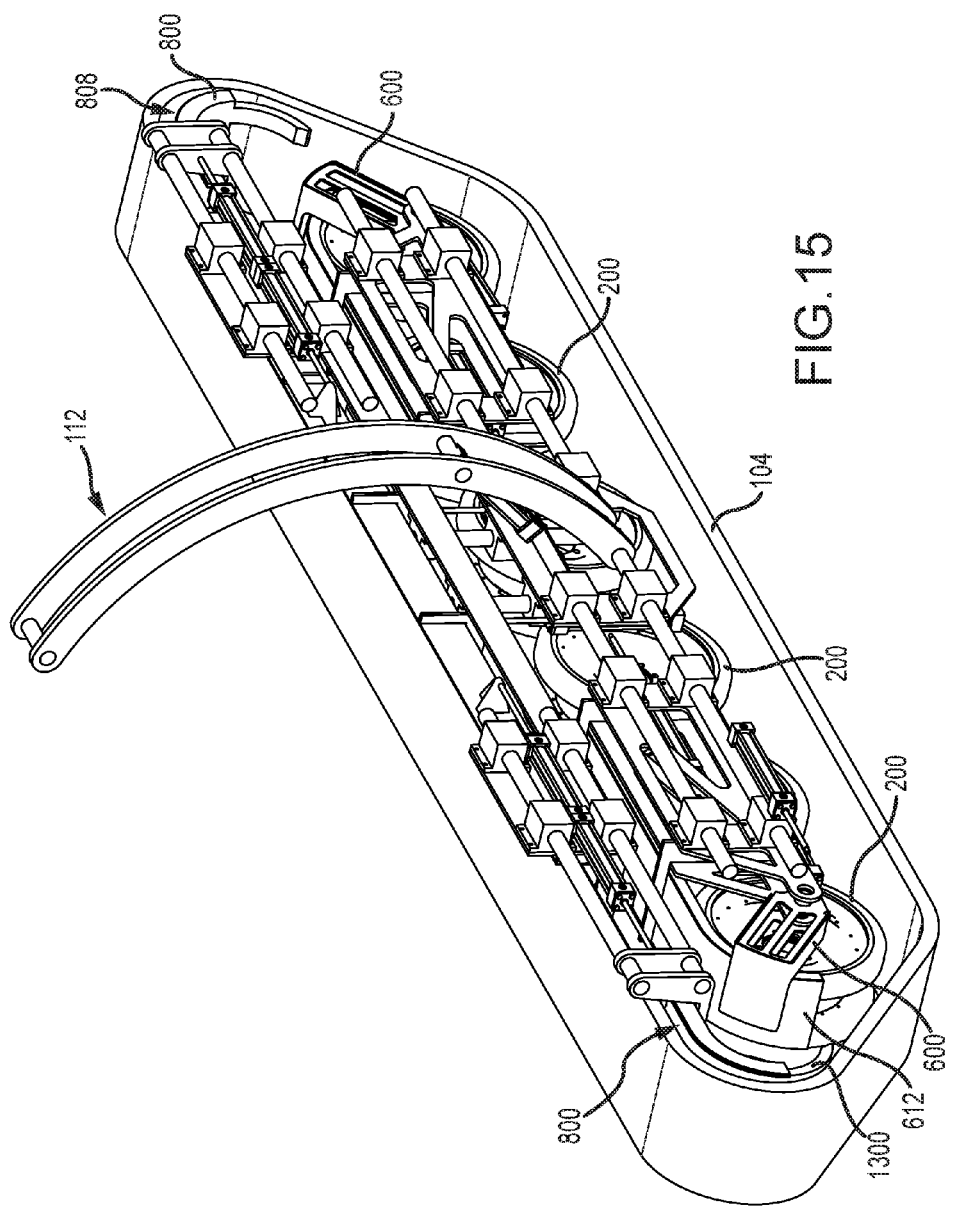

Referring now to FIG. 15, after the standoffs 600 are rotated upward, then the second upper beam end 808 near the idler is re-extended to place additional tension on the track 104 so that the track 104 engages the road wheels 200. Thereafter, the first upper beam end 804 near the armored vehicle's inner drive sprocket 1300 is retracted and then the armored vehicle's outer drive sprocket is installed.

Figure 16:
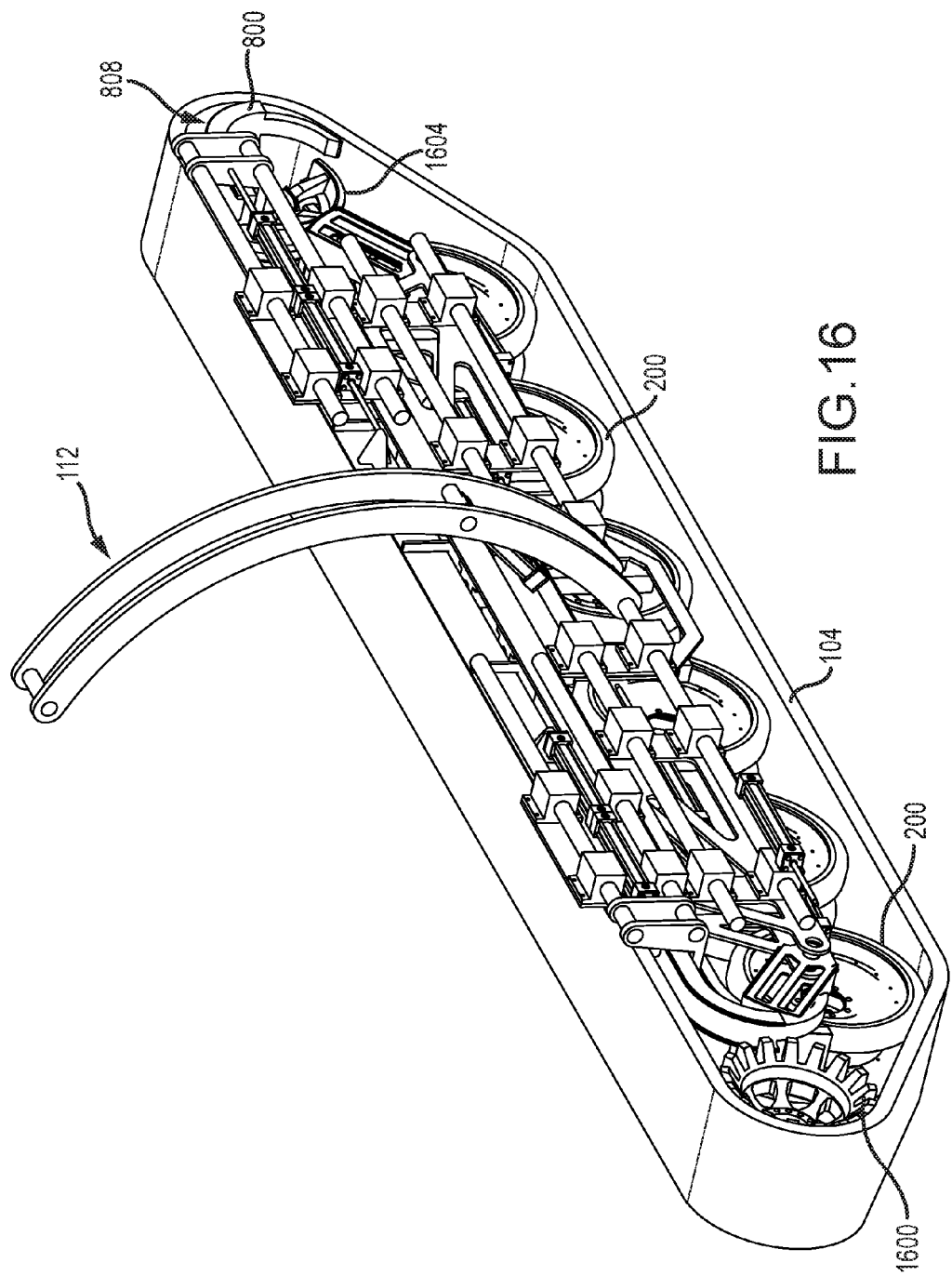

Referring now to FIG. 16, after the vehicle's outer drive sprocket 1600 is installed, the second upper beam end 808 is extended to apply tension on the track 104 and the first half of the armored vehicle's idler 1604 is installed and then rotated into position. Thereafter, the second half of the armored vehicle's idler is installed.

Figure 17:
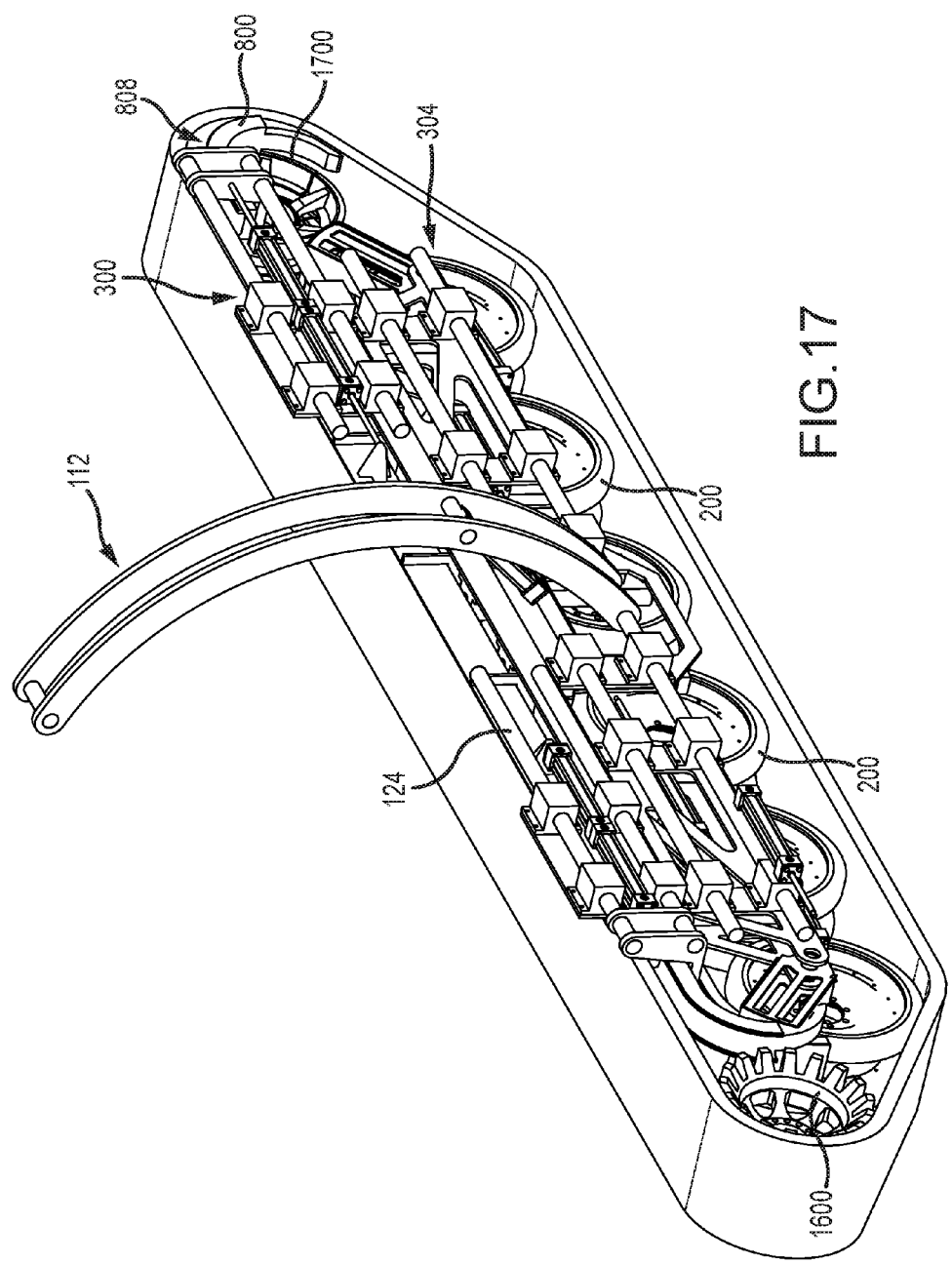

Referring now to FIG. 17, after the second half of the armored vehicle's idler 1700 is installed, the second upper beam end 808 is retracted and the upper beam member 300 and lower beam member 304 are retracted toward each other to provide removal clearance for the main frame 124 to be withdrawn.

Referring now to FIG. 18, after the track changing apparatus 100 is configured to be removed from the vicinity of the armored vehicle, the hoist member 112 is maneuvered to clear the track changing apparatus 100 from the armored vehicle. After the idler wheel is tensioned the armored vehicle can be lowered.

The one or more present inventions may be embodied in other specific forms without departing from its spirit or essential characteristics. The described embodiments are to be considered in all respects only as illustrative and not restrictive. The scope of the one or more present inventions is, therefore, indicated by the appended claims rather than by the foregoing description. All changes which come within the meaning and range of equivalency of the claims are to be embraced within their scope.

The one or more present inventions, in various embodiments, includes components, methods, processes, systems and apparatus substantially as depicted and described herein, including various embodiments, subcombinations, and subsets thereof. Those of skill in the art will understand how to make and use the one or more present inventions after understanding the present disclosure.

The one or more present inventions, in various embodiments, includes providing devices and processes in the absence of items not depicted and/or described herein or in various embodiments hereof, including in the absence of such items as may have been used in previous devices or processes (e.g., for improving performance, achieving ease and/or reducing cost of implementation).

The foregoing discussion of the one or more present inventions has been presented for purposes of illustration and description. The foregoing is not intended to limit the one or more present inventions to the form or forms disclosed herein. In the foregoing Detailed Description for example, various features of the one or more present inventions are grouped together in one or more embodiments for the purpose of streamlining the disclosure. This method of disclosure is not to be interpreted as reflecting an intention that the claimed one or more present inventions requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the one or more present inventions.

Moreover, though the description of the one or more present inventions has included description of one or more embodiments and certain variations and modifications, other variations and modifications are within the scope of the one or more present inventions (e.g., as may be within the skill and knowledge of those in the art, after understanding the present disclosure). It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus for changing an elastomeric endless track on an armored vehicle, the apparatus comprising:
    a hoist member; and
    a main frame interconnected to a lower end of the hoist member, the main frame selectively rotatable between 0 to 120 degrees from vertical, the main frame including:
        a variable length upper beam member including upper beam framing interconnecting a first track spreader at a first longitudinal end of the variable length upper beam member and a second track spreader at a second longitudinal end of the variable length upper beam member, wherein the first and second track spreaders are independently and selectively positionable at any position between and including a longitudinally extended position and a longitudinally retracted position;
        a variable length lower beam member interconnected to the variable length upper beam member, the variable length lower beam member including lower beam framing interconnecting first and second road wheel guides situated at corresponding first and second longitudinal ends of the variable length lower beam member, wherein the first and second road wheel guides are selectively positionable at any position between and including a longitudinally extended position and a longitudinally retracted position, the variable length lower beam member further including first and second rotatable standoffs interconnected to the lower beam framing, wherein said first and second rotatable standoffs are selectively positionable at any position between and including a lowered position and an upward position; and
        a plurality of variable height connectors interconnecting the variable length upper beam member to the variable length lower beam member, the plurality of variable height connectors selectively positionable at any position between and including an expanded position and a collapsed position;
    wherein the main frame is configured for contacting the elastomeric endless track for mounting the elastomeric endless track to the armored vehicle or removing the elastomeric endless track from the armored vehicle.

2. The apparatus of claim 1, wherein the hoist member includes a concave shape between an upper end and a lower end of the hoist member.

3. The apparatus of claim 1, wherein the hoist member comprises an upper lifting bar.

4. The apparatus of claim 1, wherein the hoist member includes at least two interconnected arcuate-shaped members.

5. An apparatus for changing an elastomeric endless track on an armored vehicle, the apparatus comprising:
- a hoist member including a concave shape between an upper end and a lower end of the hoist member, the hoist member further including an upper lifting bar; and
- a main frame interconnected to the lower end of the hoist member, the main frame selectively rotatable relative to the hoist member between a substantially vertical position and a substantially horizontal position, the main frame including:
  - a variable length upper beam member including upper beam framing interconnecting a first track spreader at a first longitudinal end of the variable length upper beam member and a second track spreader at a second longitudinal end of the variable length upper beam member, wherein the first and second track spreaders are independently and selectively positionable at any position between and including a longitudinally extended position and a longitudinally retracted position;
  - a variable length lower beam member interconnected to the variable length upper beam member, the variable length lower beam member including lower beam framing interconnecting first and second road wheel guides situated at corresponding first and second longitudinal ends of the variable length lower beam member, wherein the first and second road wheel guides are selectively positionable at any position between and including a longitudinally extended position and a longitudinally retracted position, the variable length lower beam member further including first and second rotatable standoffs interconnected to the lower beam framing, wherein said first and second rotatable standoffs are selectively positionable at any position between and including a lowered position and an upward position; and
  - a plurality of variable height connectors interconnecting the variable length upper beam member to the variable length lower beam member, the plurality of variable height connectors selectively positionable at any position between and including an expanded position and a collapsed position;
- wherein the main frame is configured for contacting the elastomeric endless track for mounting the elastomeric endless track to the armored vehicle or removing the elastomeric endless track from the armored vehicle.

* * * * *